(12) United States Patent
Foster et al.

(10) Patent No.: US 6,684,260 B1
(45) Date of Patent: Jan. 27, 2004

(54) MAINTAINING CONSISTENCY OF DEVICE DRIVER SETTINGS

(75) Inventors: Ward S. Foster, Boise, ID (US); John P. Daly, Eagle, ID (US); Jim F. Fordemwalt, Boise, ID (US); Nicola R. Griebe, Meridian, ID (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 0 days.

(21) Appl. No.: 09/304,810

(22) Filed: May 4, 1999

(51) Int. Cl.$^7$ ............................................. G06F 9/00
(52) U.S. Cl. ....................................... 709/327; 345/810
(58) Field of Search ............................... 709/321–327; 710/8; 702/119, 123, 108; 345/735, 747, 780, 809, 771; 713/100

(56) References Cited

U.S. PATENT DOCUMENTS

| | | | | |
|---|---|---|---|---|
| 5,228,118 A | * | 7/1993 | Sasaki | 358/1.13 |
| 5,339,432 A | * | 8/1994 | Crick | 710/8 |
| 5,500,715 A | * | 3/1996 | Ta et al. | 399/1 |
| 5,566,278 A | * | 10/1996 | Patel et al. | 358/1.13 |
| 5,579,529 A | * | 11/1996 | Terrell et al. | 710/8 |
| 5,586,324 A | * | 12/1996 | Sato et al. | 709/321 |
| 5,604,843 A | | 2/1997 | Shaw et al. | |
| 5,613,123 A | * | 3/1997 | Tsang et al. | 713/1 |
| 5,664,195 A | * | 9/1997 | Chatterji | 709/321 |
| 5,699,493 A | * | 12/1997 | Davidson et al. | 358/1.13 |
| 5,720,015 A | * | 2/1998 | Martin et al. | 709/311 |
| 5,732,282 A | * | 3/1998 | Provino et al. | 703/27 |
| 5,752,032 A | * | 5/1998 | Keller et al. | 709/311 |
| 5,761,399 A | * | 6/1998 | Asano | 358/1.15 |
| 5,809,331 A | * | 9/1998 | Staats et al. | 703/22 |
| 5,867,714 A | * | 2/1999 | Todd et al. | 717/172 |
| 5,890,014 A | * | 3/1999 | Long | 703/13 |
| 5,974,474 A | * | 10/1999 | Furner et al. | 710/8 |
| 6,009,519 A | * | 12/1999 | Jones et al. | 713/1 |
| 6,029,198 A | * | 2/2000 | Iizuka | 709/223 |
| 6,075,519 A | * | 6/2000 | Okatani et al. | 345/173 |
| 6,104,359 A | * | 8/2000 | Endres et al. | 345/3.1 |
| 6,105,142 A | * | 8/2000 | Goff et al. | 713/320 |
| 6,125,408 A | * | 9/2000 | McGee et al. | 710/8 |
| 6,128,718 A | * | 10/2000 | Schmisseur et al. | 711/212 |
| 6,133,844 A | * | 10/2000 | Ahne et al. | 340/815.45 |
| 6,148,346 A | * | 11/2000 | Hanson | 345/961 |
| 6,161,176 A | * | 12/2000 | Hunter et al. | 713/1 |
| 6,243,833 B1 | * | 6/2001 | Hitchcock et al. | 709/321 |
| 6,255,960 B1 | * | 7/2001 | Ahne et al. | 340/815.45 |
| 6,289,396 B1 | * | 9/2001 | Keller et al. | 709/108 |
| 6,300,948 B1 | * | 10/2001 | Geller et al. | 345/866 |
| 6,369,838 B1 | * | 4/2002 | Wallace et al. | 345/810 |
| 6,393,495 B1 | * | 5/2002 | Flory et al. | 709/327 |
| 6,535,229 B1 | * | 3/2003 | Kraft | 345/764 |
| 6,538,668 B1 | * | 3/2003 | Ruberg et al. | 345/747 |

FOREIGN PATENT DOCUMENTS

JP  2001282696 A  * 10/2001  ........... G06F/13/10

OTHER PUBLICATIONS

IBM Technical Disclosure Bulletin. "Printer Device Driver Property Settings Dialog On an Open Action." Jul. 1991.*
IBM Technical Disclosure Bulletin. "Printer Device Driver Properties Dialog from Office Properties." Jul. 1, 1999.*

* cited by examiner

*Primary Examiner*—John A. Follansbee
*Assistant Examiner*—Lewis A. Bullock, Jr.

(57) ABSTRACT

User input to a device driver to affect device driver settings is handled by a method according to various aspects of the present invention. The device driver has settings which include a plurality of values. The method includes the steps of (a) in response to user input, replacing the value of a setting with a new value; and then (b) reviewing all settings for consistency. During the review, additional replacements may be dictated according to rules (i.e., conditional procedures) which may have been received from a file into the device driver. Each rule accounts for one type of interaction. For example, when a user changes the media from letter paper to envelope using a printer driver user interface, the user interface is updated to show that two-sided printing and stapling settings are now off and not available. By allowing inconsistent settings to exist and then be corrected, user interface programming source code is made more manageable.

18 Claims, 5 Drawing Sheets

US 6,684,260 B1

MAINTAINING CONSISTENCY OF DEVICE DRIVER SETTINGS

FIELD OF THE INVENTION

Embodiments of the present invention relate to a user interface provided by a device driver and to data structures and methods of maintaining consistency of settings accessible via such a user interface.

BACKGROUND OF THE INVENTION

Computer systems output data to a variety of output devices, such as, printers, plotters, and video displays. These systems also accept input data from a variety of input devices, such as, scanners, network devices, and speech recognition interfaces. Each device typically has a manufacturer-defined device-specific protocol for communicating with the device. A computer system, under the control of an operating system, uses the protocol to communicate with each device. An operating system must, therefore, be programmed to cooperate with the protocol of each device to which it is connected. It would be impractical for an operating system developer to provide an interface to every available peripheral device. Moreover, frequent revisions to an operating system to permit it to cooperate with new peripheral devices may add unnecessary cost to the provision and support of an operating system on multiple computers. To overcome these difficulties, operating systems interface with peripheral devices indirectly through device drivers. The operating system developer defines a device driver interface between the operating system and the device driver. Each manufacturer of a device then provides a device driver, which implements the device driver interface and further, implements the protocol for communicating with the peripheral device. The operating system or application program loads the device driver and invokes the functions of the device driver interface to communicate with the device.

An operating system also provides support for application programs. To this end, the operating system developer defines an application program interface over which an application program may communicate to obtain the services of peripheral devices. Such an application program interface is commonly called a Graphics Device Interface (GDI) and is typically part of the operating system. The GDI effects the output of data by invoking functions implemented by the device driver in accordance with the device driver interface. The GDI and device drivers insulate the application program from the different characteristics of peripheral devices. The GDI provides a variety of functions for accessing devices in a device-independent manner. An example of a GDI is described in Programming Windows 3.1 by Charles Petzold, published by Microsoft Press, incorporated herein by reference. The GDI also specifies behavior of each function that a device driver must implement. For example, one GDI for a printer specifies six categories of functions implemented by a device driver: (1) initialization, (2) information, (3) output, (4) attribute, (5) mode, and (6) escape as described in Table 1.

TABLE 1

| Function | Description |
| --- | --- |
| (1) Initialization | |
| Control | Performs device-dependent operations such as starting an output job, aborting an output job, and processing a new band of bitmap data; |
| Disable | Deallocates memory used by the device drivers data structures and unloads the device driver from memory; |
| Enable | Allocates and initializes memory for a data structure containing device dependent and device state information; |
| WEP | Signals the device driver that the operating system is shutting down; |
| (2) Information | |
| ColorInfo | Translates physical colors to logical colors and vice versa; |
| EnumDFonts | Enumerates the fonts available on the device; |
| EnumObj | Enumerates the pens and brushes that are available on the device; |
| DevGetCharWidth | Returns width values for characters in a specified printer font; |
| (3) Output | |
| DevBitBlt | Sets pixels on the output device; |
| DevExtTextOut | Renders text on the output device; |
| Output | Renders s shape on the output device; |
| Pixel | Sets a single pixel on the output device; |
| ScanLR | Sets pixels in a single row of the output device; |
| StretchBlt | Renders scaled bitmaps on the output device; |
| (4) Attributes | |
| RealizeObject | Converts a logical pen, brush, font, etc. data structure to a physical pen, brush, font, etc. data structure; |
| (5) Modes | |
| DeviceMode | Displays a dialog box that allows a user to select device options, such as, paper size, paper orientation and output quality; |
| (6) Escape | |
| QueryEscSupport | Specifies whether the output device supports a specified escape sequence; |
| SetAbortDoc | Invokes the abort procedure of any application program; |
| StartDoc | Signals the beginning of an output job; |
| NextBand | Outputs a band of bitmap data; |
| EndDoc | Signals the end of an output job; |
| AbortDoc | Signals the abnormal termination of an output job; |

As an example of the operation of the GDI described above, an application program outputs data to a particular device by first requesting the GDI to create a device context. The device context identifies the particular peripheral device and contains the current state of the peripheral device. For example, the device context may contain the current font and brush information. The GDI provides the application program with a handle to the created device context. The application program passes the handle to the device context whenever the application program outputs data to the particular device. The GDI functions use the passed handle to access the device context.

Each of the functions provided by a device driver may be uniquely programmed by the manufacturer of the peripheral device. This approach leads to several areas of difficulty which add to the cost of providing peripheral devices for mass marketing distribution. For example, when a manufacturer provides several lines of peripheral devices, it is desirable to provide device drivers implemented from reusable software components. In this approach, each new peripheral can be supported with a device driver having consistent behaviors shared with device drivers built for prior peripheral device products. In addition, it is desirable to design device drivers that are portable (i.e., common code reused for different operating systems), flexible (i.e., new features may be added with minimal redevelopment and testing), and consistent (i.e., the structural organization of the device driver software is similar among device drivers for different products and/or different product lines).

A device driver may provide a user interface for permitting the user of an application program to modify selected attributes of the device context. The operating system cooperates with the device driver to provide the user interface. In a conventional user interface, dialog boxes are shown on the screen with controls that respond to user input for the specification of new values for attributes. Because the dialog box provides the user with the flexibility of modifying attributes in an ad hoc manner, conventional device drivers assure that user input will not result in an inconsistent group of attributes.

An attribute is referred to herein as a device setting. A plurality of attributes may be collectively referred to as a device setting or as a plurality of device settings. Therefore, a device setting may include one or more attributes. Each attribute may be referred to as a parameter. Each attribute has an identity and one or more values.

Typically, consistency checks are made prior to modifying the value of a device setting. That portion of the device driver program responsible for accepting a modified device setting for one of the controls of the dialog necessarily is programmed with knowledge of the behavior of one or more other controls. This interaction between controls complicates software development of the device driver user interface. Further, by accounting for consistency checking in the programming of each control, the resulting device driver user interface is less amenable to reuse for the development of future device drivers. Development of device drivers using this approach, therefore, cannot obtain the desirable features discussed above.

In view of the problems described above and related problems that consequently become apparent in the art of device driver development, the need remains for methods of responding to user input provided to a device driver and methods for maintaining the consistency of device settings.

SUMMARY OF THE INVENTION

A memory device in one embodiment of the present invention has indicia of a method for responding to user input provided to a device driver. The device driver has settings. Each setting has a respective value. The method includes the steps of (a) in response to user input, establishing, for a first setting having a first value, a second value for the first setting, the second value replacing the first value, the second value being a member of the plurality of values; and (b) after the step of establishing, reviewing for consistency the plurality of values.

By establishing a possibly inconsistent plurality of values and then reviewing for consistency, various consistency checks may be made more efficiently and the programming source code for implementing the method may be written and maintained in a manner less prone to redundant logic.

A memory device in another embodiment of the present invention has indicia of a method for responding to user input provided to a device driver. The device driver has settings. Each setting has a respective value. The method includes the steps of: (a) in response to user input, establishing, for a first setting having a first value, a second value for the first setting, the second value replacing the first value, the second value being a member of the plurality of values; and (b) performing a review after the step of establishing. The review includes the steps of (b1) storing in a first list an indicia of the first setting; and (b2) executing in turn each procedure of a plurality of procedures, each procedure possibly affecting a second list; and (b3) in response to determining that the second list is not empty, performing the following steps: (i) replacing the contents of the first list with the contents of the second list; and (ii) repeating the review. Each procedure of the plurality of procedures includes indicia of a setting to be tested. Each procedure performs the following steps: (a) proceeding with performance of the respective procedure upon successful comparison of the contents of the first list and the respective indicia of a setting to be tested; (b) establishing, for a respective second setting having a third value, a fourth value for the second setting, the fourth value replacing the third value, the fourth value being a member of the plurality of values; and (c) storing in a second list an indicia of the respective second setting.

By using two lists, all procedures review the same context for inconsistency checking, namely the context provided by the first list. Making reference to the first list for context minimizes any consequence of interaction between procedures, simplifying device driver user interface development.

A memory device in a third embodiment of the present invention includes indicia of a method for maintaining consistency of a plurality of settings for a peripheral device. The method includes the steps of (a) modifying at least one setting of the plurality of settings in response to user input; (b) after the step of modifying, validating the plurality of settings by performing a plurality of checks, where each check includes conditionally further modifying the plurality of settings in response to determining that an inconsistency is present among the plurality of settings; and (c) repeating the step of validating, in response to determining that any check determined that an inconsistency indeed was present.

BRIEF DESCRIPTION OF THE DRAWING

Embodiments of the present invention will now be further described with reference to the drawing, wherein like designations denote like elements, and.

DETAILED DESCRIPTION OF PREFERRED EMBODIMENTS

Figure 1:
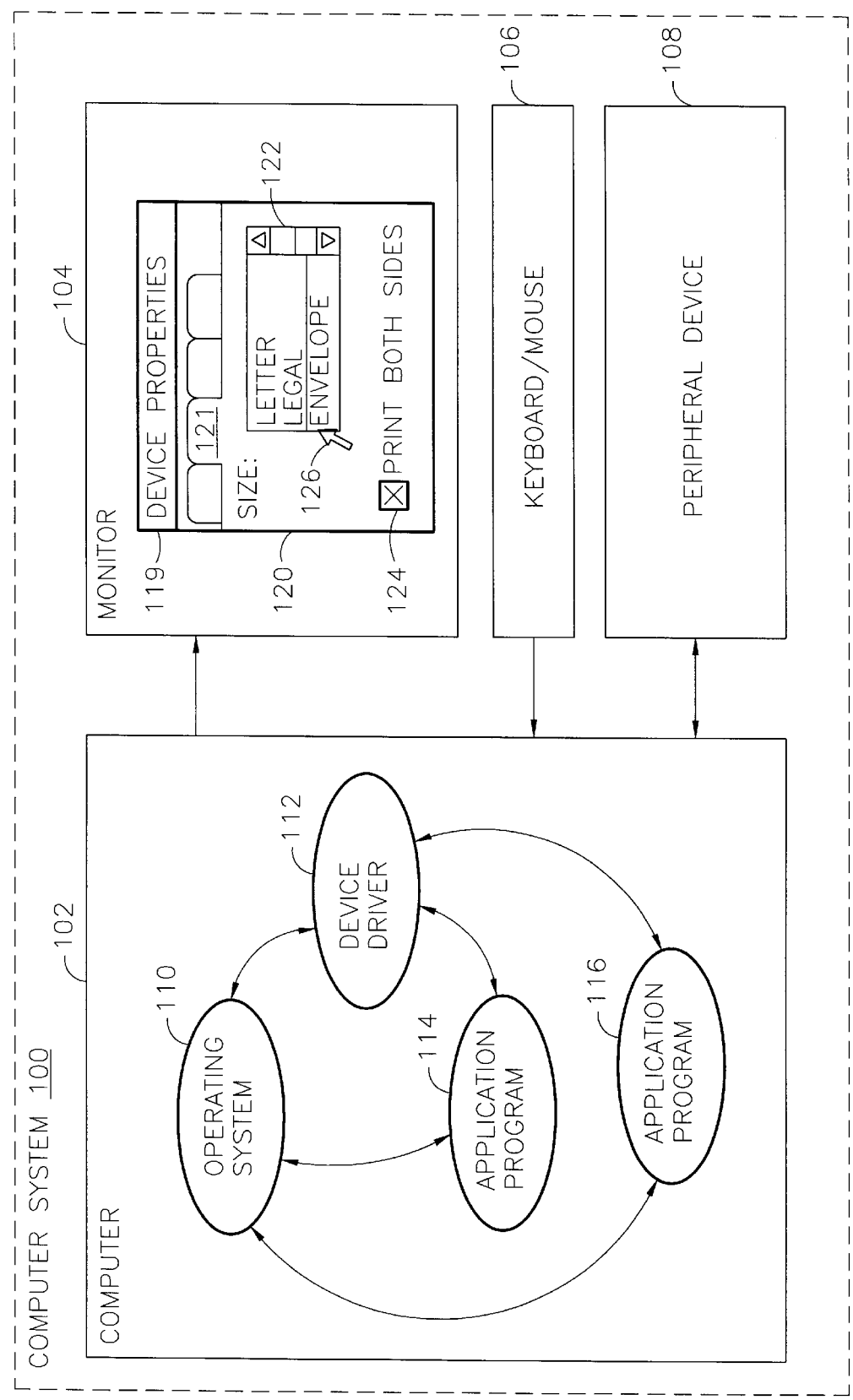
FIG. 1 is a functional block diagram of a computer system according to various aspects of the present invention.

The present invention provides a method executed by a computer for maintaining consistency of a plurality of settings for a peripheral device. For example, a computer system, according to various aspects of the present invention, includes a computer, a monitor, a user input device, and one or more peripheral devices. Inasmuch as sophisticated peripheral devices conventionally include a computer, a front panel display, and touch panel switches as a user input device, the operation of the method of the present invention may be performed entirely within a peripheral device. On the other hand, computers and peripherals interconnected by conventional data communications may also serve as a platform for performance of a method according to various aspects of the present invention. The term computer, therefore, includes a variety of data processing circuits and systems ranging from a microcontroller serving a process control function, a laptop or desktop computer serving a personal information organization function, or an assembly of client and server equipment interconnected by a network for providing support for a wide range of conventional peripheral devices. Of course, a computer conventionally includes one or more processors in cooperation with one or more memory devices. A memory device includes any semiconductor circuit, magnetic, or optical data storage device, which may be removable, nonremovable, read only, or read/write. Such a memory device includes, according to various aspects of the present invention, indicia of instructions or statements which are executable or interpretable by one or more of the processors.

For example, various methods of the present invention will be described with reference to FIGS. 1 through 5 depicting a simplified personal computer system. A computer system, according to various aspects of the present invention, provides consistent device settings in response to modification of device settings by a user of the computer system. Consistency is obtained by a method for responding to user input provided to a device driver. Such a method is performed, for example, by a device driver that cooperates with an operating system and a peripheral device. Computer system 100 of FIG. 1, includes computer 102, monitor 104, keyboard/mouse 106, and peripheral device 108. Computer 102 includes a conventional computer as discussed above, which in operation executes the instructions of an operating system 110, one or more application programs 114, 116, and a device driver 112 for the purpose of coordinating use of the peripheral device 108 in accomplishing the purposes of one or more application programs.

Monitor 104 may be any conventional computer monitor. As shown, monitor 104 presents a graphical user interface (GUI) in cooperation with operating system 110.

To receive user input in response to information displayed on monitor 104, computer system 100 includes a conventional keyboard, a conventional pointing device, or a combination of other conventional input devices. A user of computer system 100 operates input devices 106 to make selections and/or dictate values in cooperation with the operating system's GUI.

Peripheral device 108 may include any conventional peripheral device including input devices, output devices, and devices for any combination of input and output. Input devices include keyboards, pointing devices, document scanners, audio capturing devices, video capturing devices, and conventional instrumentation. Output devices include monitors, printers, facsimile, copiers, image recording apparatus, audio reproduction devices, and conventional process control apparatus. Input/output devices may include conventional audio, video, and data communications devices, network interface equipment, telephone equipment, and information appliances.

As discussed above, each peripheral device may cooperate with a computer according to a unique electrical and communications protocol. Because peripheral devices are manufactured to accommodate a wide variety of differing computer system environments, and because peripheral devices are manufactured with a wide variety of capabilities, the conventional peripheral device necessarily includes an interface for the specification of a wide number of device-specific attributes. The types, functions, and names of attributes (and values for the same attribute) may vary between peripheral devices, between installations of the same peripheral device, and between applications of the peripheral device for the performance of functions of one or more application programs. A device setting includes one or more values for attributes and further may include attribute identifiers (e.g., name strings). For example, device settings may be different for each print job directed to a printer. Device settings are managed by a program conventionally called a device driver.

Operating System 110 may include any program for managing the execution of one or more application programs. For example, Operating System 110 may include the WindowsNT Operating System marketed by Microsoft Corporation (WINDOW NT is a trademark of Microsoft Corporation). Operating system 110 provides a graphical user interface and one or more interfaces to device drivers. For example, the interface between operating system 110 and device driver 112 with respect to peripheral device 108 as a conventional laser printer, includes a graphics device interface, as described above. Operating system 110 also provides application program interfaces for the cooperation of application programs 114, 116 with operating system 110 and cooperation of applications programs 114, 116 and device driver 112. For simplicity in describing the methods according to various aspects of the present invention, all communication involving device driver 112 and other processes of computer 102 is summarily referred to as being supported by a device driver interface.

A graphical user interface provides information to the user by presenting message boxes and/or dialog boxes. A dialog box, as shown in FIG. 1, may include a title bar 119 and a body 120. Body 120 may include various controls including tabbed pages 121, list box 122, and check box 124. In a conventional manner, the user of computer system 100 may direct a pointing device 106 with visual feedback provided by a mouse pointer 126 that appears on the monitor 104. By directing the mouse pointer 126 to a portion of list box 122, the user may select one or more items from list box 122. In the example shown, operating system 110 has provided a dialog box entitled "Device Properties" for a printer, as peripheral device 108. One or more of the tabbed pages 121 may include a so-called properties page which provides a user interface for modifying printer device settings. In the example shown, property page 121 describes current device settings for media type and duplex operations. As shown, media type is currently "envelope" and the duplexing operation has been selected as shown by the filled checkbox 124. Although it is conventional to apply duplex printing to media of letter or legal size, one or more device settings calling for duplex operation on an envelope are herein considered inconsistent. One or more device settings may be considered inconsistent because (a) operation according to the device setting(s) exceeds the capability of peripheral device 108 or (b) operation according to the device setting(s) exceeds the specification for the system design and so is not to be supported. Peripheral device 108 is not equipped to provide a duplex operation on envelopes. Of course, other peripheral devices, as well as other printers, may have other combinations of inconsistent attribute values. In this example, the media type attribute and the duplex operation attribute are illustrated as inconsistent for the purpose of describing a method for maintaining consistency, according to various aspects of the present invention.

Figure 2:
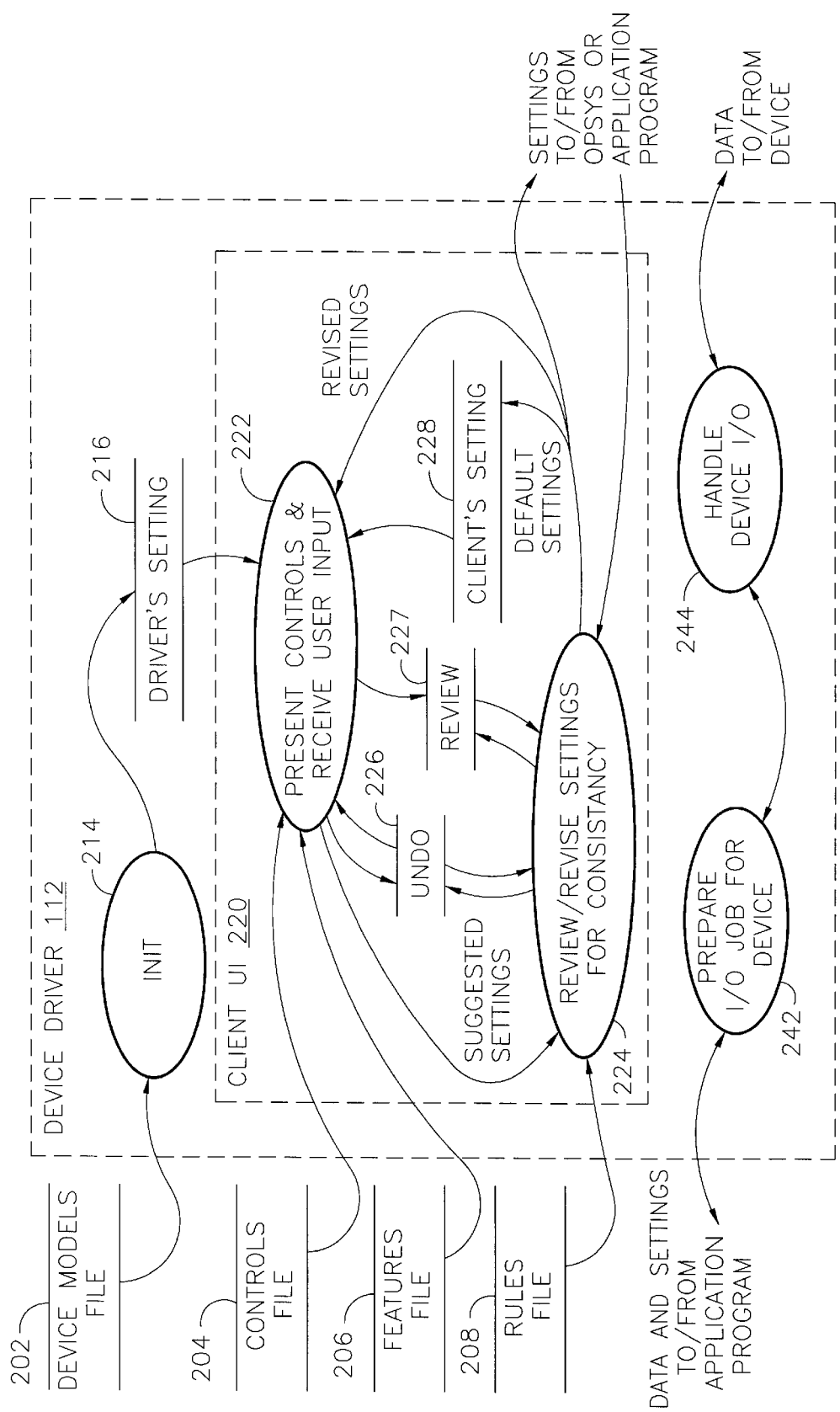
FIG. 2 is a data flow diagram of operation of the device driver in the computer system of FIG. 1.

For the support of user-modified device settings, device driver 112 includes several processes as illustrated, for example, in FIG. 2. device driver 112 includes initialization process 214, user interface process 222, validation process 224, job preparation process 242, and device interface process 244. Device driver 112 supports the capability of reading device specific information from device models file 202. For example, initialization process 214 may read device models file 202 and store values of device settings in driver's settings 216. This initialization of driver's settings 216 may be accomplished upon the initial installation of peripheral device 108, or upon a configuration change in peripheral device 108 at any time. Such a configuration change may include the installation of additional mechanical or electrical apparatus, as desired. Installation of a peripheral device may be actual or virtual. Actual installation includes the physical and/or logical connection of actual peripheral device 108 to computer 102. Virtual installation may include, for example, configuring device driver 112 to provide data or to receive data via a network or mass storage device for the purpose of a store-and-forward operation without connection of an actual peripheral device. Virtual installation provides the capability of supporting functions of application program 114 or 116 in an environment where peripheral device 108 is unavailable.

When properly configured, device driver 112 provides data from input peripheral devices through device interface process 244 and job preparation process 242 to supply data and settings to application programs 114, 116. In such an operation, device interface process 244 handles device I/O according to the protocol unique to peripheral device 108, as discussed above. Also, job preparation process 242 receives information from device interface process 244, for example, text for a scanned page and provides that information to the application program requesting cooperation with peripheral device 108. Job preparation process 242 may provide device settings as stored by device driver 112 or as provided by peripheral device 108 in connection with an I/O job.

For supporting an output peripheral device, job preparation process 242 receives information from application programs 114, 116 and provides that information as an I/O job to device interface process 244. Device interface process 244 cooperates with peripheral device 108 according to the protocol discussed above to transfer data to the output device.

Device driver 112 includes any program supporting input, output, or input/output peripheral devices as described above. In addition, device driver 112 permits modification of device settings in accordance with one or more client user interface sessions. Device driver 112 may support interaction with operating system 110, application program 114, and application program 116. One or more client user interface sessions may be sequentially or simultaneously supported. For example, client user interface session 220 includes a unique instantiation of user interface process 222, validation process 224, undo list 226, review list 227, and client's settings 228.

Initialization of all client user interface sessions may be accomplished by initialization process 214. Initialization process 214 establishes driver's settings 216 which may be read for system level default settings. Driver settings 216 may be stored and recalled from a file (e.g., an .INI file) and/or from the registry maintained by the operating system. Any client user interface session may perform another initialization process to establish a starting point for further user interactive review and/or modification of device settings. Alternatively, device driver 112 may, at any time, initialize a particular client user interface session according to controls, features, and rules available to the device driver through operating system 110.

Client user Interface 220 may read controls file 204, features file 206 and rules file 208 in order to initialize user interface process 222 and validation process 224. Controls file 204 may include data and/or program instructions for completely or partially describing controls, dialog boxes, and/or message boxes to be used by user interface process 222. Information from controls file 204 is sufficient for user interface process 222 in defining all operations in cooperation with the graphical user interface of operating system 110. By reading controls file 204, a particular client user interface session 220 may present a different layout, logic, and organization supporting modification of device settings.

User interface process 222 may also read features file 206. Features file 206 may include data and/or program instructions that completely or partially describe one or more device settings. A description of a device setting may include, an attribute identifier, a range of values permitted for the attribute, and/or a list of permitted or restricted values. In operation, for example, features corresponding to optional equipment may be read by user interface process 222 in conjunction with the installation of corresponding equipment in peripheral device 108.

Validation process 224, as will be discussed in detail below, performs one or more consistency checks for each one or group of device settings. Although all consistency checks may be organized as a single process (i.e., a single rule), in a preferred configuration, validation process 224 performs a set of processes, each process being limited in scope to cover possible inconsistencies among a subset of device settings.

Rules file 208 may include a complete or partial set of processes to be applied in connection with one or more device settings. Rules file 208 may include rules affecting device settings for one or more peripheral devices when, for example, device driver 112 supports more than one (or more than one type) of peripheral device.

Information in device models file 202, controls file 204, features file 206, and rules file 208 may be stored in any conventional format in one or more physical files. Device models file may include information of the type described in U.S. Pat. No. 5,604,843 to Shaw entitled "Method and system for Interfacing with a Computer Output Device," incorporated herein by reference. Alternatively, multiple devices may be described in one device models file. Information described above with reference to files 202 through 208 may conform to a format of the type resulting from a conventional object serialization process for moving the state of an object from memory (e.g., RAM) accessed for instruction execution to other memory (e.g., disk). Storing and loading rules as serialized objects facilitates preparing, distributing, modifying, updating, loading, and integrating rules for a validation process.

Operation of client user interface 220 may be better understood in light of an example wherein it is assumed that peripheral device 108 is a conventional laser printer and application programs 114 and 116 are conventional word processing programs. In this example, device driver 112 may provide access to device settings in at least one of three ways. First, device settings may be stored in the context of computer system 100 for use by all users of the same peripheral device. Access to such system level device settings is provided to operating system 110 by device driver 112, for example, by means of dialog boxes appropriate for system administration. Second, device settings may be accessed on a user and/or application program basis, for example, so that a user may become accustomed to specific peripheral device operation in cooperation with programs selected by the same user. These user and/or application program specific device settings may be stored in the user's profile and/or an application program profile. When stored in an application program profile, all users of the application program may have use of the peripheral device from similar device settings. Third, device settings may be stored with (or in association with) an I/O job that is associated with the particular peripheral device. In the latter case, for example, printer device settings may be stored with a document to be printed. In each of these three modes of accessing and storing device settings, device settings may include all or a selected portion of the device settings available in connection with a particular peripheral device.

When application program 114 requests access to device settings for a printer (e.g., to print a word processing document), device driver 112 activates a client user interface 220 and a user interface process 222. User interface process 222 may receive default device settings from several sources. For example, device settings may be recalled from driver settings 216 to give effect to stored system level device settings. When appropriate, user or application program specific device settings may be recalled from client's settings 228. And, device settings may be provided to device driver 112 from the application program in connection with a particular I/O job. Regardless of the method by which user interface process 222 obtains current and/or default device settings, user interface process 222 prepares a dialog box with appropriate controls and appropriate initial values of the attributes described by the dialog box and then presents the dialog box via the GUI to the user. Upon receipt of user input, user interface process 222 prepares suggested device settings and provides the suggested device settings to validation process 224. In addition to providing suggested device settings, user interface process 222 may post attribute identifiers and values on undo list 226 and may post attribute identifiers on review list 227, for purposes described in greater detail below.

Validation process 224, upon receipt of suggested device settings, reviews the suggested device settings for consistency among the suggested device settings themselves and/or consistency among all device settings including the suggested device settings. If an inconsistency is determined to exist, validation process 224 may revise the originally suggested device settings or make a copy of the originally suggested device settings and revise the copy. In either case, validation process provides such revised device settings to one of three destinations. Revised device settings may be provided directly to user interface process 222 in response to the earlier provision of suggested device settings. Revised device settings may also be stored in client's settings 228 as newly established default settings. Or, revised device settings may be provided to the operating system or application program in response to device driver 112 being called by either operating system 110 or application program 114. In each case, revised device settings are sure to be internally consistent and/or consistent within all device settings.

Consistency of device settings is maintained, in accordance with various aspects of the present invention, by performing a method preferably performed by device driver 112, particularly client user interface 220. A method of the present invention includes any method that establishes suggested device settings prior to reviewing device settings for consistency. Such a method may be implemented according to any programming language and program development methodology. For example, such a method may be implemented using object-oriented programming techniques, procedural programming techniques, or a combination of object-oriented and procedural techniques. For simplicity of explanation, a procedural description of such a method is described in the flow charts presented in FIGS. 3 through 5.

Figure 3:
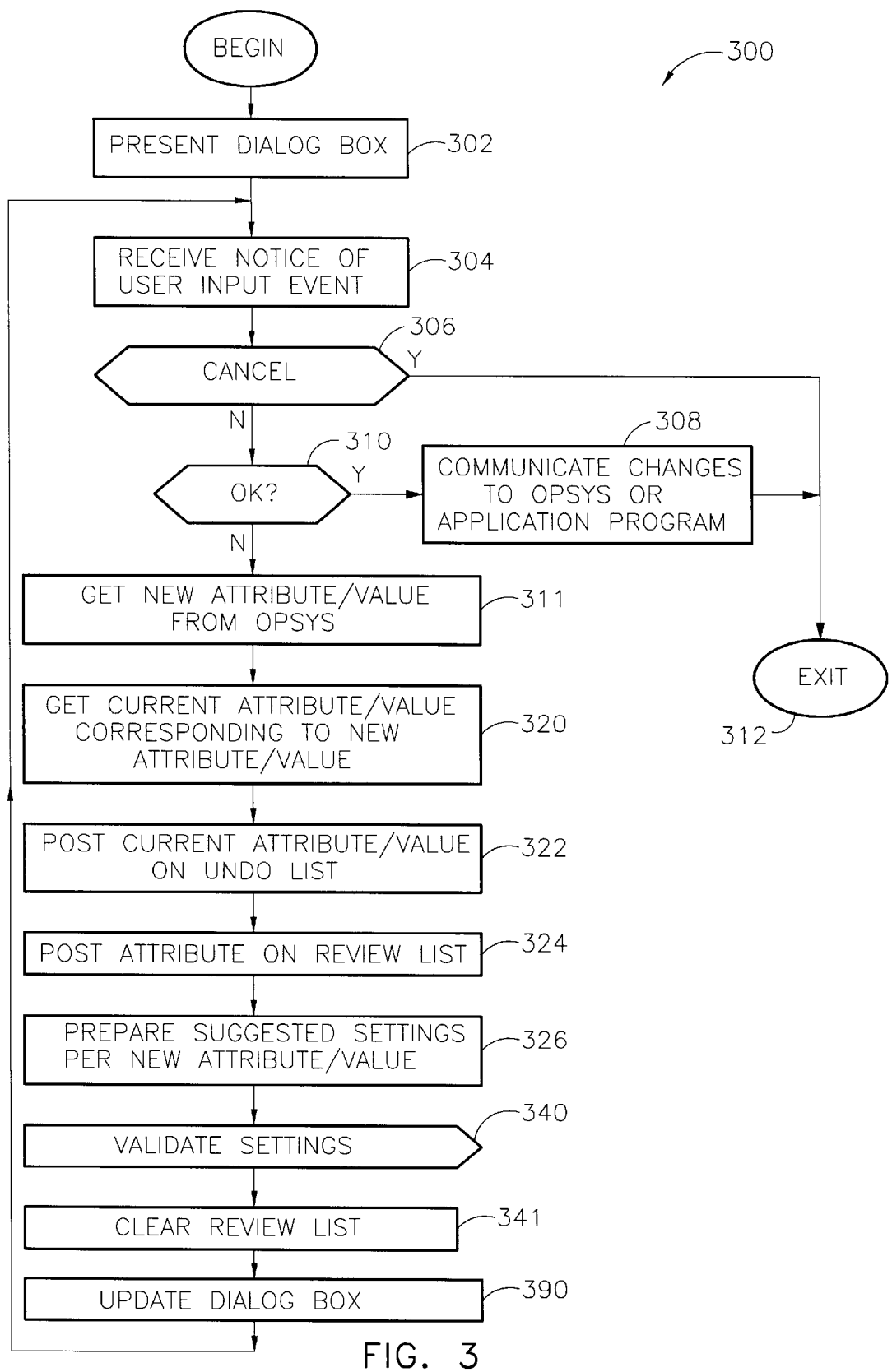
FIGS. 3 through 5 constitute a flow chart of a method performed by the device driver of FIG. 2.

At step 302 of FIG. 3, a dialog box is presented to the user. In a graphical user interface (GUI), the presentation of a dialog box begins a user input session during which the user may activate various controls presented graphically in the dialog box. These controls include any conventional feature of a dialog box supported by the operating system including, for example, a command button, a text box, a list box (possibly with horizontal and vertical scroll bars), a drop down list box, an option button, a check box, a spin-edit box, or a combo-box. Upon activation of a control, the operating system passes a message to the device driver. For example, because the dialog box in step 302 was presented by device driver 112, operating system 110 will provide a user input event message to device driver 112 on the completion of any user input event. The completion of a user input event may be the completion of an entry in a text box, the completion of selection of one or more items from a list box, the activation of an exclusive option button, or the activation of one or more non-exclusive check boxes. Command buttons include (a) the conventional "OK", "Cancel", and "Help"; (b) buttons that give rise to one or more additional dialog boxes, for example, "Settings", "Set-up", or "Options"; and (c) buttons (tabs that may appear in a tab-organized dialog box) that activate another property page. If the user input event includes text (as in a text box) or a numeric entry (as in a spin-edit box), the text string or numeric value may accompany the user input event message.

At step 304, device driver 112 receives notice of a user input event. Such a notice may include information from which device driver 112 may determine the type of event that occurred. Such information is defined by the device driver interface. Accordingly, at step 306, device driver 112 is able to determine whether the "Cancel" command button was activated or at step 310 whether the "OK" command button was activated.

At step 306, device driver 112 determines that the "Cancel" command button was activated, device driver 112 takes no further action and exits at step 312 control returns to the operating system or to the application program, whichever initially took action requiring the device driver's response.

At step 310, device driver 112 determines whether the "OK" command button was activated. If so, the user has indicated that the device settings shown in the dialog box presented in step 302, or as discussed in detail below, are acceptable.

At step 308, device driver 112 communicates the device settings to operating system 110 or to the application program that called device driver 112. Settings may be communicated by passing a pointer to a device settings structure in a manner as described above with respect to a device context. Note that such a device settings structure, by operation method 300, is assured to be internally consistent.

At step 311, user interface process 222 obtains information from the operating system that includes an identifier of the attribute affected by the user input event and a new value for the attribute, if any. An identifier of the attribute may include a reference to the dialog box control used to modify the attribute or a reference to a name of the attribute. A reference in either case may include a string value, an enumerated code, a pointer, and/or a handle. Interface process 222 may include a map (or mapping process) that translating the identifier provided by the operating system to an entry point for processing the identified attribute event. When the operating system supports handling multiple entries in a dialog box, the information supplied by the operating system may include a data structure for each user modification/selection, each data structure including an attribute identifier and one or more values.

If neither the "Cancel" nor the "OK" command button has been activated, the user input event is understood to include one or more modified or selected values for one or more attributes as indicated in the dialog box. At step 320 device driver 211 obtains from the message obtained at step 304 the identifier of the attribute(s) affected by the user input event. The current value(s) for each identified attribute is then obtained, and at step 322 is posted on undo list 226. An identifier of the attribute to which each value is associated is also posted on undo list 226.

At step 324, the name of each attribute is also posted on review list 227. Undo list 226 and review list 227 may be organized in any conventional manner, including organization as an array of structures, a linked list, or according to a combination of conventional data storage techniques.

At step 326, user interface process 222 prepares suggested device settings in accordance with the attribute(s) and value (s) received at step 304. Suggested device settings may include a data structure having all device settings recorded therein, a pointer to such a structure, or a data structure describing the device settings only to the extent modified by user input.

At step 340, validation process 224 receives the suggested settings and performs a validation process indicated as a subroutine call, discussed below.

Upon return from all places the validate settings subroutine 340, at step 341, review list 227 is cleared. The undo list may also be cleared. After clearing, the contents of the review list or undo list indicates no listed items (e.g., no attribute identifiers or values). At step 390, user interface process 222 updates the presented dialog box. Control then passes back to step 304 to await an additional user input event.

Figure 4:
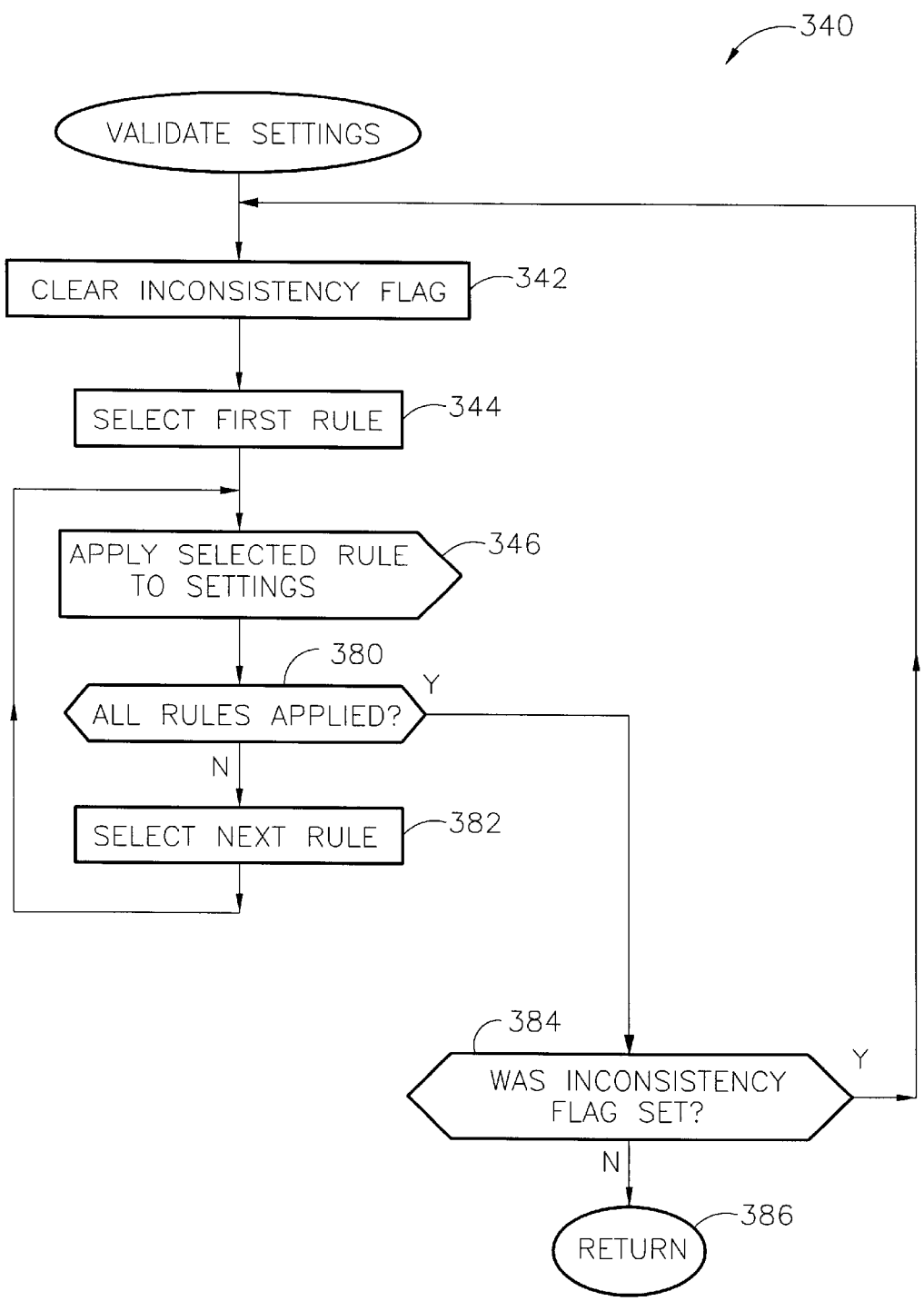
Figure 5:
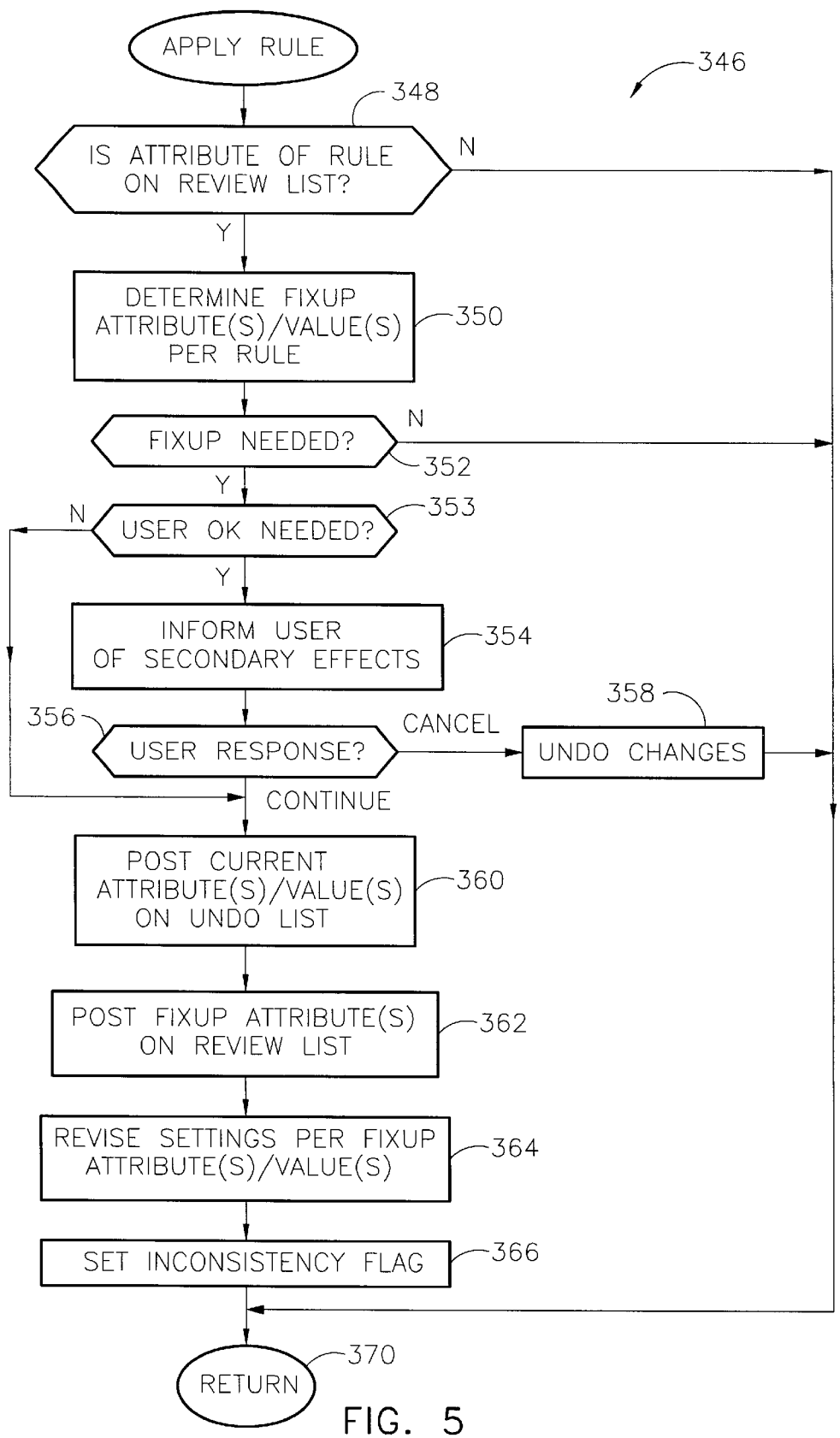

Validation process 224 performs a validate settings process, for example as described in FIG. 4. The validation process may perform the validate settings subroutine 340 at any time that suggested device settings are available for review.

At step 342, a binary value referred to as the "inconsistency flag" is reset. The terminology "set" and "reset" does not imply which of the two binary values of the flag is associated with the asserted state of the flag. In other words, if "0" is the asserted state of the flag by design choice, then resetting the flag is accomplished by assigning the value "1" to the binary flag value.

Validation may be accomplished by performing in turn each process of a predefined set of processes. The predefined set of processes may be developed as a core capability of device driver 112. However, according to various aspects of the present invention, information for performing one or more processes (or one or more sets of processes) may be read by device driver 112 from rules file 208 and incorporated for reference by the validation process 224 as discussed above. Upon entry of the validate settings subroutine, the set of processes sufficient to validate device settings has already been established. At step 344, a first rule is selected from this set of processes. The set of processes may be organized according to a predefined selection sequence. For example, rules may be ordered to be selected according to priority. Higher priority rules being selected prior to lower priority rules. By establishing a priority for each rule, for example, such that rules which may affect multiple attribute values are considered with higher priority than rules which affect a lesser number of attributes, validation of device settings may be accomplished more efficiently, or with less risk of falling into an undesirable indefinite state. An indefinite state may arise when two rules dictate different values for the same attribute. Following selection of a first rule, control passes into a loop which includes steps 346, 380, and 382.

At step 346, the selected rule is applied to the suggested device settings (or all device settings including the suggested device settings). Metacode descriptions of the operative portion of a few exemplary rules are set out in Table 2.

TABLE 2

| Example Check | Metacode Description |
| --- | --- |
| Media sizes allowed for duplexing | IF (settings specify duplexing) THEN<br>    IF (mediaSize is envelope, legal, A5, or custom) THEN<br>        ask user "Keep duplex?"<br>        IF (response is "yes") THEN<br>            impose secondary effects: mediaSize = letter<br>        ELSE undo this user input cycle<br>        ENDIF<br>    ENDIF<br>ENDIF |
| Media types fed only from MP tray | IF (settings specify mediaType as transparency,<br>    glossy, label, or cardstock) THEN<br>    IF (settings specify mediaSource as not MP tray) THEN<br>        tell user "Must Use MP tray"<br>        impose secondary effect: mediaSource = MP tray<br>    ENDIF<br>ENDIF |
| Color treatment | Enforce the following matrix:<br><br>  treatment    ICM    OCS<br><br>  ColorSmart   off    RGB<br>  ICM    on    RGB<br>  Custom    off    RGB<br>  Gray    off    Gray |

Step 346 may be defined as a subroutine as illustrated for convenience in FIG. 4. After application of the selected rule, control passes on return from the subroutine to step 380. At step 380, it is determined whether all rules in the set of processes have been applied. If not, at step 382, the next rule from the set of processes is selected and control passes back to step 346. If all rules have been applied, control passes from step 380 to step 384.

At step 384, it is determined whether the inconsistency flag has been set by operation of at least one of the rules in the set of processes. If the inconsistency flag has not been set, validation of device settings is complete and control passes via the return at step 386 back to step 360, as described with reference to FIG. 3.

If it is determined that the inconsistency flag has been set, control passes back to step 342 to repeat the validate settings subroutine as a whole. By repeating the validate settings subroutine as a whole, any attribute values that may have been modified during the performance of any selected rule are also reviewed for the possibility of an inconsistency among all device settings. As an alternative to establishing a priority among rules, as discussed above, transfer back to step 342 may be limited to an arbitrary number of times, after which transfer of control passes to step 386 regardless of the state of the inconsistency flag.

Application of a selected rule is accomplished without regard to the complexity or simplicity of the rule. For example, subroutine 346 is described in an exemplary flow diagram of FIG. 5. At step 348, validation process 224 determines whether an attribute of the selected rule appears on review list 227. For each rule, the attributes referred to and/or modified by the rule are available on a list, called a scope list, associated with the rule. To determine whether an attribute of the scope list of the selected rule is on the review list 227, validation process 224 performs a conventional comparison between these two lists. If one or more attribute identifiers (e.g., name strings) appear on both lists, then control passes to step 350. If not, control then passes to step 370, whereupon the rule is considered to have been applied and the apply-selected-rule subroutine returns to step 380 described above with reference to FIG. 4.

At step 350, validation process 224 determines whether one or more attribute values are to be modified in the process of applying the selected rule. Such a modification dictated by a rule is herein called a secondary effect. When determining the current value associated with an attribute, an attribute identifier (e.g., supplied or mapped from information received at step 311) may be passed to an object responsible for all attribute values. When the attribute values are organized as a tree, the object searches the tree for a node having an attribute identifier matching the attribute identifier passed. The value(s) associated with the attribute are then returned. By maintaining attributes in an object's state data without reference to memory addressing, settings (e.g., driver's settings, client's settings, suggested settings, and revised settings) may be stored and communicated using conventional object serialization techniques. By arranging attributes in a tree, name conflicts among attributes may be avoided and multiple devices (printer or printer accessory models) may be described in the same tree.

At step 352, it is determined whether the modification of an attribute is needed in order to restore consistency in the suggested device settings (or all device settings including the suggested device settings). This determination may be accomplished either (a) by allowing the rule to impose modifications immediately and later comparing the settings after the rule has been applied to detect if modifications in fact were made; or (b) by determining that a modification of a particular attribute is dictated by the rule prior to making the modification. The logic of step 350 is illustrated in Table 2 and in FIG. 5 according to the second approach. If no secondary effects are to be imposed, control passes to step 370 for a return to the calling process as described above. If secondary effects are (or have been) imposed, control passes to step 353.

At step 353, validation process 224 determines whether it is necessary or desirable to inform the user of a secondary effect detected by application of the selected rule. In cases where it is not desirable to inform the user of the secondary effect, control passes to step 360. On the other hand, where it is desirable to inform the user and/or permit the user to retract one or more of the user's input events, control passes from step 353 to step 354.

At step 354, Validation process 224 presents one or more dialog or message boxes to inform the user of the nature and possible consequences of this secondary effect. This presentation of information may be accomplished in any conventional manner. For example, a conventional message box with the "OK" command button may be used.

At step 356, Validation process 224 awaits another user input event. Upon obtaining a user input event in the context of the presented dialog or message box, control passes to step 358 or step 360. Control will pass to step 358 if the user's response includes operation of a "Cancel" control.

At step 358, in response to user input received at box 356, one or more user-directed modifications will be reversed. In addition, secondary effects may also be reversed. To reverse a change, reference is made by validation process 224 to undo List 226. As discussed above, an attribute identifier and prior value may be stored on undo list 226. The contents of undo list 226 may include values for attributes which the user has modified, for example, as posted at step 322; or, attributes and values as posted during operation of any selected rule, for example as posted at step 360. At step 358, it is preferred to reinstate the attribute values that existed prior to receipt of the user event indicated at step 304. Note that if the user input event at step 304 has been validated by a complete operation of step 340, then the scope of the undo operation at step 358 corresponds to undoing one user input event cycle.

Control passes from step 356 to step 360 on the determination that the user's response at step 356 was operation of a "Continue" control. At step 360, 362 and 364, validation process 224 performs operations as described in step 322, 324, and 326 in an analogous manner with respect to the one or more attributes and values defined to be modified in compliance with the selected rule as discussed above with reference to step 350.

At step 366, the inconsistency flag is set. Note that the inconsistency flag will not be set if (a) at step 348 no attribute on the review list implicates application of the selected rule; (b) application of the rule would not involve modifying the value of any attribute; or (c) the attribute modification deemed necessary by the rule was not accomplished as directed by a "Cancel" operation.

In an alternate method, according to various aspects of the present invention, determination of an inconsistency does not involve an inconsistency flag. Instead, validation includes the following modified steps.

At step 324, posting is made to a first review list. Before step 340 of FIG. 3, a second review list is cleared. At step 362 of FIG. 5, attribute(s) for secondary effect(s) are posted to a second review list. And, at step 384 of FIG. 4, inconsistency is determined to exist when the second review list is not clear, i.e., at least one secondary effect attribute was modified. Each rule at step 348 refers only to the first review list. If inconsistency is determined to exist, the second review list is copied (to replace) the first review list; and, the second review list is cleared before continuing with step 344.

The foregoing description discusses preferred embodiments of the present invention which may be changed or modified without departing from the scope of the present invention as defined in the claims. While for the sake of clarity of description, several specific embodiments of the invention have been described, the scope of the invention is intended to be measured by the claims as set forth below.

What is claimed is:

1. A memory device having indicia of a method for responding to user input provided to a device driver, the device driver having settings, each setting having a respective value, the method comprising:

in response to user input, establishing, for a first setting having a first value, a second value for the first setting, the second value replacing the first value, the second value being a member of a plurality of values;

selecting a first procedure from a plurality of procedures, selection being in accordance with an indicia of the first setting;

performing the first procedure, wherein the first procedure comprises establishing, for a second setting having a third value, a fourth value for the second setting, the fourth value replacing the third value, the fourth value being a member of the plurality of values; and to review for consistency the plurality of values, selecting a second procedure of the plurality of procedures, selection being in accordance with an indicia of the second setting and then performing the second procedure.

2. The memory device of claim 1 wherein:

the method further comprises storing in a first list the indicia of the first setting and the indicia of the second setting; and each step of selecting is performed in accordance with contents of the first list.

3. The memory device of claim 1 wherein the first procedure further comprises providing a message to a user, the message identifying the second setting.

4. The memory device of claim 1 wherein the method further comprises:

storing, on a first list, the first value associated with any indicia of the first setting;

storing, on the first list, the second value associated with any indicia of the second setting; and in response to user input, and in accordance with contents of the first list, reinstating each respective value contained in the first list for each respective setting identified by associated indicia of a respective setting.

5. The memory device of claim 1 wherein the method further comprises reading indicia of the plurality of procedures from a second memory device.

6. A memory device having indicia of a method for responding to user input provided to a device driver, the device driver having settings comprising a plurality of values, the method comprising:

in response to user input, establishing, for a first setting having a first value, a second value for the first setting, the second value replacing the first value, the second value being a member of the plurality of values; and after the step of establishing:

storing in a first list an indicia of the first setting;

performing in turn each procedure of a plurality of procedures, each procedure comprising indicia of a setting to be tested, each procedure comprising:

proceeding with performance of the respective procedure upon successful comparison of contents of the first list and the respective indicia of a setting to be tested;

establishing, for a respective second setting having a third value, a fourth value for the second setting, the fourth value replacing the third value, the fourth value being a member of the plurality of values; and storing in a second list an indicia of the respective second setting; and in response to determining that the second list is not empty:

replacing the contents of the first list with the contents of the second list;

clearing the second list; and repeating the step of performing in turn each procedure.

7. A memory device comprising indicia of a method for maintaining consistency of a plurality of settings for a peripheral device, the method comprising;

modifying at least one setting of the plurality of settings in response to user input;

after the step of modifying, validating the plurality of settings by performing a plurality of checks, each check comprising modifying a respective setting of the plurality of settings in response to determining that inconsistency is present among the plurality of settings; and repeating the step of validating, in response to determining that any check determined inconsistency was present.

8. The memory device of claim 7 wherein:

each check further sets a flag in response to determining that inconsistency is present;

the method further comprises resetting the flag prior to each performance of the step of validating; and the step of repeating comprises repeating in response to the flag being set.

9. The memory device of claim 7 wherein the method further comprises reading indicia of the plurality of checks from a second memory device.

10. The memory device of claim 7 wherein a check of the plurality further comprises providing a message to the user in response to determining that inconsistency is present among the plurality of settings.

11. The memory device of claim 7 wherein the method further comprises:

recording a copy of the plurality of settings; and after the step of recording, reinstating, in response to user input, the plurality of settings in accordance with the copy.

12. The memory device of claim 7 wherein the method further comprises:

making a copy of the plurality of settings;

making each respective modification to the copy; and in response to user input, discarding the copy.

13. The memory device of claim 7 Wherein the peripheral device comprises a printer that receives data in accordance with the plurality of settings.

14. The memory device of claim 7 wherein the peripheral device comprises a scanner that provides data in accordance with the plurality of settings.

15. A method for maintaining the consistency of settings, comprising:

in response to user input, replacing a first value for a first setting with a second value, the first and second values being members of a plurality of values; and automatically, without user interaction, reviewing the second value for consistency among the plurality of values; wherein:

reviewing comprises selecting a first procedure from a plurality of procedures, selection being made in accordance with an indicia of the first setting and then performing the first procedure;

the first procedure comprises replacing a third value for a second setting with a fourth value, the third and fourth values being members of the plurality of values; and reviewing further comprises selecting a second procedure of the plurality of procedures, selection being made in accordance with an indicia of the second setting, and performing the second procedure.

16. The method of claim 15 further comprising storing in a first list the indicia of the first setting and the indicia of the second setting, and wherein each step of selecting is performed in accordance with contents of the first list.

17. The method of claim 15, wherein the first procedure further comprises providing a message to the user, the message identifying the second setting.

18. The method of claim 15, further comprising:

storing, on a first list, the first value associated with any indicia of the first setting;

storing, on the first list, the second value associated with any indicia of the second setting; and in response to user input, and in accordance with contents of the first list, reinstating each respective value contained in the first list for each respective setting identified by associated indicia of a respective setting.

* * * * *